United States Patent
Ogawa et al.

(10) Patent No.: US 7,153,352 B2
(45) Date of Patent: Dec. 26, 2006

(54) INK FOR INKJET RECORDING

(75) Inventors: Hiroyuki Ogawa, Ibaraki-ken (JP);
Toshihiro Endo, Ibaraki-ken (JP);
Hajime Tsunoda, Ibaraki-ken (JP);
Teruaki Ohkawa, Ibaraki-ken (JP);
Osamu Matsumoto, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 45 days.

(21) Appl. No.: 10/842,540

(22) Filed: May 11, 2004

(65) Prior Publication Data
US 2004/0227799 A1    Nov. 18, 2004

(30) Foreign Application Priority Data
May 12, 2003  (JP)  ............................. 2003-133226

(51) Int. Cl.
*C09D 11/02* (2006.01)
(52) U.S. Cl. ............................... 106/31.58; 106/31.86; 106/31.27; 106/31.6
(58) Field of Classification Search ............. 106/31.58, 106/31.86
See application file for complete search history.

(56) References Cited

U.S. PATENT DOCUMENTS

| | | | | |
|---|---|---|---|---|
| 3,957,694 A * | 5/1976 | Bolon et al. | ................. | 252/514 |
| 4,049,844 A * | 9/1977 | Bolon et al. | ................. | 427/511 |
| 4,608,484 A * | 8/1986 | Erwin | ......................... | 235/101 |
| 4,793,264 A * | 12/1988 | Lin et al. | ................. | 106/31.35 |
| 5,843,219 A * | 12/1998 | Griffin et al. | ............ | 106/31.88 |
| 5,929,135 A * | 7/1999 | Wasai et al. | ................. | 523/161 |
| 6,379,440 B1 * | 4/2002 | Tatum et al. | ............. | 106/31.13 |
| 2001/0045175 A1 * | 11/2001 | Ouchi et al. | ................ | 106/31.6 |
| 2002/0171725 A1 * | 11/2002 | Ouchi et al. | ................. | 347/100 |
| 2003/0177948 A1 * | 9/2003 | Ohkawa et al. | .......... | 106/31.86 |
| 2003/0192453 A1 * | 10/2003 | Ohkawa et al. | .......... | 106/31.57 |
| 2005/0206701 A1 * | 9/2005 | Komatsu et al. | .............. | 347/96 |
| 2005/0223939 A1 * | 10/2005 | Uozumi et al. | .......... | 106/31.58 |

FOREIGN PATENT DOCUMENTS

| | | | |
|---|---|---|---|
| EP | 1111017 A1 * | 6/2001 | |
| JP | 2001-164157 A | 6/2001 | |
| JP | 2002-201387 A | 7/2002 | |
| WO | WO 96/12772 A1 | 5/1996 | |

* cited by examiner

*Primary Examiner*—J. A. Lorengo
*Assistant Examiner*—Veronica Faison-Gee
(74) *Attorney, Agent, or Firm*—Fitch, Even, Tabin & Flannery

(57) ABSTRACT

An ink for inkjet recording containing a vehicle, coloring agents dispersed therein, and a dispersing agent for the coloring agents as required, is provided. The vehicle contains at least a first solvent component and a second solvent component. The first solvent component has the lowest boiling point among the components in the ink, and has a higher viscosity than the ink. The second solvent component has a higher boiling point than the first one. The boiling point of the first solvent component is preferably 280 degree C. or below, and the content thereof is preferably 10 to 80% by weight based on the total weight of the ink. Even when the ink is printed on non-coated papers, the vehicle penetrates little in the thickness direction and bleeds little in the horizontal direction. Clogging in the nozzles can be prevented effectively using the ink even when it has been left in an open atmosphere for a long time.

9 Claims, No Drawings

INK FOR INKJET RECORDING

BACKGROUND OF THE INVENTION

1. Field of the Invention

The present invention relates to an ink for inkjet recording comprising a non-aqueous vehicle and a coloring agent dispersed therein.

2. Description of the Related Art

Inkjet recording is a printing method in which droplets of a liquid ink high in fluidity are ejected from fine nozzles of an inkjet recording head and transferred to a recording medium such as paper. This method is advantageous in that images high in resolution and quality can be printed at high speed and with low noise using relatively inexpensive apparatuses, and so has recently become popular rapidly.

For such inkjet recording, aqueous inks are generally used, which are prepared by dissolving water-soluble dyes such as acid dyes, direct dyes, and basic dyes, or dispersing pigments in an aqueous vehicle consisting of water and glycol-based solvents or water-soluble organic solvents. However, when a recording head which has been filled with an aqueous ink is left in the atmosphere, viscosity of the ink increases due to evaporation of water from the ink, thereby causing the ejection of the ink from the nozzles to be unstable or impossible. In order to cope with this problem, a large number of methods have been proposed to stabilize the ejection of ink droplets during printing. These methods are based on so-called preliminary discharging in which inks that have increased in viscosity are previously discharged and removed to a location other than recording media. However, these methods are disadvantageous in that the ink must be consumed for the purpose other than recording.

Unlike aqueous inks, non-aqueous inks that contain no water are roughly classified into solvent-based ones and oil-based ones. The former has a vehicle consisting mainly of volatile solvents and the latter has a vehicle consisting mainly of non-volatile solvents. Especially, oil-based inks are suitable for use as inks for high-speed inkjet printers since viscosity of the inks hardly increases due to little evaporation of solvents even if the recording head is left in the atmosphere and thus frequency of cleaning or preliminary discharging can be reduced before printing.

However, conventional oil-based inks are problematic in that they cannot keep print quality constant. This is because such inks are high in permeation speed since their vehicles that are composed mainly of dispersing agents and solvents are low in surface tension and viscosity. Further, the vehicles contain non-volatile solvents as the main component thereof, and thus penetrate in the thickness direction or bleed in the horizontal direction of recording media particularly when the inks are printed on paper and other ink-permeable recording media. In addition, these vehicles tend to remain in recording media, and there often occurs seep through or strike through on paper.

In order to solve the above-mentioned problems, it might be considered to use recording media having a surface coated with pigments or the like, for example, so-called coated paper or lightly coated paper. However, such coated paper or lightly coated paper is costly but not economical, compared with non-coated paper.

In order to prevent the bleeding or strike through of vehicles, it might be considered to improve ink formulation so that vehicles do not remain in recording media. Specifically, it would be suggested to use a solvent low in boiling point. However, the solvent low in boiling point readily evaporates from the ink present in the nozzles when the recording head is left to stand in the atmosphere and then viscosity of the ink increases, thereby causing the problem of discharge failure.

Use of a solvent having a predetermined boiling point is proposed, for example, in JP-A-2002-201387, which discloses that when a solvent having a boiling point of 180 to 260 degree C. and a vapor pressure of 0.5 mmHg or less at room temperature constitutes 90% or more of the solvents, inks can be prevented from rapidly increasing in viscosity and causing nozzle clogging, thereby minimizing the probability that the solvent remains in the coated films. In addition, an inkjet ink that contains a solvent having a high boiling point of 180 degree C. or above is disclosed in JP-A-2001-164157. Furthermore, an inkjet ink that contains both a polar solvent and a non-polar solvent having a boiling point of at least 100 degree C., more preferably 200 degree C. or above is disclosed in International Publication No. WO96/12772. These proposals are effective in controlling the rapid increase in viscosity of inks, but still cause the increase of ink viscosity and the discharge failure when the recording head is left to stand for several hours or longer. Therefore, nozzle-restoring operations such as preliminary discharging and nozzle cleaning have been frequently required.

BRIEF SUMMARY OF THE INVENTION

Under the above-mentioned circumstances, it is an object of the present invention to provide an ink for inkjet recording, which hardly causes vehicles to penetrate in the thickness direction and bleed in the horizontal direction of recording media even when it is printed on non-coated paper, and which hardly causes nozzle clogging even when it is left to stand for a long period of time.

According to the present invention, there is provided an ink for inkjet recording that contains a vehicle and a coloring agent dispersed therein. The vehicle contains at least a first solvent component and a second solvent component, wherein the first solvent component has the lowest boiling point among the components in the ink and has a higher viscosity than the ink, and the second solvent component has a higher boiling point than the first solvent component.

The present invention is most featured in that a solvent consisting of at least two kinds of solvent components, a first solvent component and a second solvent component, is contained in the vehicle of the ink, wherein the first solvent component has a low boiling point and high viscosity and the second solvent component has a high boiling point and low viscosity. Thus, even when the vehicle evaporates with the recording head being left to stand in an open state, the first solvent component that is low in boiling point and high in viscosity evaporates prior to the second solvent component that is high in boiling point and low in viscosity. In other words, the solvent component of higher viscosity evaporates preferentially, thereby retarding the viscosity increase of the ink present in nozzles of the recording head and inhibiting discharge failure of the ink. Furthermore, when ink droplets are ejected on a recording medium, solvents hardly remain in the recording medium due to their adequate evaporation, thereby preventing the bleeding or strike through of the vehicle.

DETAILED DESCRIPTION OF THE INVENTION

The ink of the present invention is basically composed of a vehicle and a coloring agent dispersed therein. The vehicle is basically composed of a non-aqueous solvent and may contain other additives such as dispersing agents, if necessary.

The non-aqueous solvent that constitutes the vehicle is prepared by mixing at least two solvent components as described above, and specifically is composed of at least a first solvent component having the lowest boiling point among the components in the ink and higher viscosity than the ink, and a second solvent component having a higher boiling point than the first solvent component. Since the viscosity of the first solvent component is higher than that of the ink, the viscosity of the second solvent component is lower than that of the first solvent component.

Each of the first solvent component and the second solvent component can be properly selected from various non-aqueous solvents, on condition that both satisfy the above-described relative conditions of the boiling point and the viscosity. These solvents may be any of polar solvents and non-polar solvents, and both may be used in combination on condition that the mixture form a single phase.

Examples of the polar solvents include fatty acids, esters, alcohols and ethers. Examples of the fatty acids include isopalmitic acid, oleic acid, and isostearic acid. Examples of the esters include methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, soybean oil methyl ester, soybean oil isobutyl ester, tall oil methyl ester, tall oil isobutyl ester, diisopropyl adipate, diisopropyl sebacate, diethyl sebacate, propylene glycol monocapric ester, trimethylolpropane tri-2-ethylhexanoic ester, and glycerol tri-2-ethylhexanoic ester. Examples of the alcohols include isopalmityl alcohol, isostearyl alcohol, and oleyl alcohol. Examples of the ethers include glycol ether-based solvents, such as diethylene glycol monobutyl ether, ethylene glycol monobutyl ether, propylene glycol monobutyl ether, and propylene glycol dibutyl ether.

As the non-polar solvents, naphthenic, paraffinic, and isoparaffinic solvents can be used. Examples of the non-polar solvents include ISOPAR and EXXOL available from Exxon Mobil Corporation; AF Solvent available from Nippon Oil Corporation; and SUNSEN and SUNPAR available from Japan Sun Oil Co., Ltd. The above-mentioned "ISOPAR", "EXXOL", "AF Solvent", "SUNSEN" and "SUNPAR" are trade names or registered trademarks of the respective companies.

The boiling point of the first solvent component is preferably 280 degree C. or below, more preferably 150 to 280 degree C., and most preferably 200 to 280 degree C. If the boiling point is excessively high, the solvent component does not evaporate during printing and remains in the recording medium, thereby causing the bleeding and strike through of the vehicle. If the boiling point is excessively low, the evaporation speed of the solvent component increases and then the pigment content in the ink present in the nozzles increases in a relatively short time, causing unstable discharge of the ink from the nozzles. The viscosity of the first solvent component at 23 degree C. is normally 10 mPa·s or more, preferably 20 mPa·s or more, more preferably 30 mPa·s or more, and most preferably 50 mPa·s or more. If the viscosity is excessively low, droplets of the ink become difficult to be ejected in series from the high-frequency head nozzles.

As the first solvent component, a polar solvent is preferable; especially from the standpoint of the corrosion resistance of the material used for the inkjet recording head, an alcoholic solvent having 6 or more carbon atoms in one molecule is preferable. Examples of such alcoholic solvents include straight-chain aliphatic alcohols, such as hexanol, heptanol, octanol, nonanol, decanol, and undecanol; branched-chain higher alcohols such as isomyristyl alcohol; and monoterpene alcohols such as α-terpineol.

The content of the first solvent component is preferably 10 to 80% by weight, more preferably 15 to 45% by weight, and especially preferably 20 to 40% by weight, based on the total quantity of the ink. If the content is less than 10% by weight, the bleeding and strike through of the vehicle cannot be prevented because the quantity of the volatile component is small. If the content exceeds 80% by weight, the pigment content increases after the ink has been left for a long period of time and then the ink viscosity increases, thereby causing clogging in nozzles.

The second solvent component has a higher boiling point and lower viscosity than a selected first solvent component, and can be suitably selected from various solvents listed above. The boiling point of the second solvent component is preferably 235 degree C. or above, and more preferably 250 to 360 degree C. If the boiling point is excessively high, the solvent component does not evaporate during printing and remains in the recording medium, thereby causing the bleeding or strike through of the vehicle. If the boiling point is excessively low, the evaporation speed of the solvent component increases and the pigment content of the ink present in the nozzles increases in a relatively short time, thereby causing unstable discharge of the ink. The viscosity of the second solvent component at 23 degree C. is normally less than 10 mPa·s, preferably 7 mPa·s or less, and more preferably 6 mPa·s or less. If the viscosity is excessively high, the discharge of the ink droplets becomes impossible when the environmental temperature is low upon discharge. Examples of the preferable second solvent components include aliphatic esters such as soy-bean oil methyl ester, and naphthenic, paraffinic and isoparaffinic solvents.

In the present invention, there will be no need to say that the vehicle can contain a solvent component other than the above first and second solvent components for the purpose of adjustment of ink viscosity, dilution of pigments, or the like.

The dispersing agents added to the vehicle are not specifically limited on condition that it can stably disperse coloring agents to be used in a solvent, and polymeric dispersing agents are preferably used. Examples of commercially available products as the polymeric dispersing agents include SOLSPERSE 5000 (phthalocyanine ammonium salt based), 13940 (polyester amine based), 17000, 18000 (aliphatic amine based), 22000, 24000, and 28000 available from Lubrizol Japan Ltd.; EFKA 400, 401, 402, 403, 450, 451, 453 (modified polyacrylate), 46, 47, 48, 49, 4010, 4050, 4055 (modified polyurethane) available from Efka Chemicals; DEMOL P, EP, POIZ 520, 521, 530, HOMOGENOL L-18 (polycarboxylate polymer type surfactants) available from Kao Corporation; DISPARLON KS-860, KS-873N4 (polyester acid amine salt) available from Kusumoto Chemicals, Ltd.; and DISCOL 202, 206, OA-202, OA-600 (multichain polymeric nonionic surfactants) available from Daiichi Kogyo Seiyaku Co., Ltd.

As coloring agents, dyes such as oil-soluble dyes, or pigments can be used, and pigments are preferably used. As the pigments, conventionally known pigments generally used in the printing industry, including organic and inorganic pigments, can be used without any particular limitation. Examples of the pigments include carbon black, cadmium red, chromium yellow, cadmium yellow, titanium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, thioindigo pigments, quinophthalone pigments and metal complex pigments.

The content of the coloring agent varies depending on the type of the coloring agent to be used, and is preferably 2 to 20% by weight, more preferably 4 to 15% by weight based on the total weight of the ink. The particle diameter of the pigment is preferably within a range from 0.01 to 1 µm.

The ink of the present invention can be prepared by mixing respective components such as solvents, dispersing agents and coloring agents using a suitable dispersing machine such as a bead mill.

The viscosity of the ink of the present invention varies depending on the diameter of nozzles, driving conditions of the nozzles and the constitution of the recording head, and is preferably 5 to 30 mPa·s at 23 degree C. The viscosity may be preferably adjusted by properly setting the types and quantities of the respective components such as solvents, dispersing agents and coloring agents, and can be adequately adjusted by adding viscosity regulators or the like.

It is also preferable that the ink of the present invention contains a vehicle which hardly remains in the recording media, or that the volatility of the vehicle is higher, so as to prevent the bleeding or strike through. Therefore, the weight loss of the ink after the ink has been left to stand in open state at 50 degree C. for 10 days is preferably 0.04 g/cm² or more. Hereupon, the weight loss is calculated by dividing the change in the weight after the ink has been left in a certain container to stand in open state by the area of the gas-liquid interface.

The ink of the present invention is characterized in that increase in the viscosity is small even after it has been left to stand in open state, and practically, it is preferable that the change in the viscosity of the ink at the time when the weight of the ink decreases by 30% after it has been left to stand in open state at 50 degree C., satisfies the following inequality:

$$-10 < 100 \times (\eta_{30} - \eta_0)/\eta_0 < 25$$

wherein $\eta_0$ denotes the viscosity of the ink before it is allowed to stand, $\eta_{30}$ denotes the viscosity of the ink at the time when the weight of the ink is reduced by 30% after it has been allowed to stand at 50 degree C. in open state, and $100 \times (\eta_{30} - \eta_0)/\eta_0$ denotes change in ink viscosity.)

The ink that satisfies such a weight loss and change in viscosity can be prepared by adequately selecting the type and quantity of the respective components such as solvents, dispersing agents and coloring agents.

EXAMPLES

The present invention will be described below in further detail referring to the Examples and Comparative Examples. In the Examples described below, the percentages and parts are shown by weight unless otherwise specified.

Example 1

After mixing solvent components in accordance with the formulation shown in Table 1, a dispersing agent was dissolved in the solvent to prepare a vehicle. Thereafter, carbon black was added to a small quantity of the vehicle and premixed, and then the mixture was mixed with the rest of the vehicle by means of a bead mill for the residence time of about 20 minutes to prepare an ink. The viscosity of each solvent component and the resultant ink was measured using a Model RE105L viscosity meter manufactured by Toki Sangyo Co., Ltd.

Examples 2–5 and Comparative Examples 1–3

Each ink was prepared in the same manner as in Example 1, except that the formulation was in accordance with that shown in Table 1. The viscosity of each solvent component and the resultant ink was measured in the same manner as in Example 1.

Test Example

Each ink obtained in the above-described Examples and Comparative Examples was subjected to the following tests (1) to (3). The results are shown in Table 1.

(1) Measurement of Change in Ink Viscosity

In a beaker of a volume of 100 ml and an inner diameter of 50 mm, 20 g of ink was poured and allowed to stand in a 50 degree C. environment, and change in the viscosity when the weight thereof was reduced by 30% was calculated from the following equation.

$$\text{Percentage change in viscosity (\%)} = 100 \times (\eta_{30} - \eta_0)/\eta_0$$

wherein $\eta_0$ denotes the viscosity of the ink before it was allowed to stand, and $\eta_{30}$ denotes the ink viscosity at the time when the weight of the ink has been reduced by 30% after it was allowed to stand at 50 degree C. in open state. The viscosities were measured in the same manner as in Example 1.

(2) Weight Loss of Ink Per Unit Surface Area at 50 Degree C. for 10 Days

In a beaker of a volume of 100 ml and an inner diameter of 50 mm, 20 g of ink was poured and allowed to stand in a 50 degree C. environment, and weight loss of the ink after 10 days was measured. The resultant weight loss value was divided by the area of the ink surface in the beaker to obtain the weight loss of the ink per unit surface area.

(3) Bleeding of Vehicle

One day after solid printing of a 2 cm square on plain paper using a share mode inkjet recording head manufactured by Xaar, the bleeding of the vehicle spread out of the edge of the printed portion was visually evaluated in accordance with the following criteria.

G: Not observed

F: Slightly observed

P: observed (4) Clogging in Nozzles

After the inkjet recording head, in which the ink remained, was left to stand for 12 hours after printing in the same manner as in the item (2) above, one more printing was performed and whether ink droplets are properly discharged from the head or not was checked. The results were evaluated in accordance with the following criteria.

G: Ink droplets were properly discharged from all the nozzles

P: Some nozzles did not discharge ink droplets

TABLE 1

| Component | Type | Boiling point (degree C) | Viscosity at 23 degrees C (mPa · s) | Example 1 | Example 2 | Example 3 | Example 4 | Example 5 | Comparative Example 1 | Comparative Example 2 | Comparative Example 3 |
|---|---|---|---|---|---|---|---|---|---|---|---|
| Carbon black | MA8 | | | 5 | 5 | 5 | 5 | 5 | 5 | 5 | 5 |
| Dispersing agent | S13940 | | | 5 | 5 | 5 | 5 | 5 | 5 | 5 | 5 |
| Solvent | α-terpineol | 219 | 53 | 32 | 15 | | | | | | |
| | 1-decanol | 231 | 12.5 | | | 41 | | 38 | | | |
| | FOC140 | 259–276 | 54.5 | | | | 37 | | 40 | | |
| | AF4 | 239–263 | 2.8 | 19 | 9 | | | | 38 | 30 | 30 |
| | AF5 | 279–303 | 5.4 | | | 9 | 35 | | | | |
| | AF6 | 301–321 | 6.8 | | | | | | | 28 | |
| | Soybean oil methyl ester | 330–358 | 5.3 | 39 | 59 | 40 | 18 | 12 | 20 | 45 | 30 |
| | FOC180 | 292–302 | 496 | | 7 | | | 2 | | 17 | 30 |
| Total (parts) | | | | 100 | 100 | 100 | 100 | 100 | 100 | 100 | 100 |
| Ink viscosity at 23 degree C (mPa · s) | | | | 9.3 | 9.2 | 9.3 | 12.4 | 7.5 | 10 | 10.3 | 10.8 |
| Percentage change in ink viscosity (%) | | | | 0.5 | 10 | 2.2 | 12 | 24.3 | 55 | ND | 80 |
| Weight loss of ink per unit surface area at 50 degree C for 10 days (g/cm$^2$) | | | | 0.46 | 0.21 | 0.33 | 0.06 | 0.55 | 0.29 | 0.02 | 0.10 |
| Bleeding of vehicle | | | | G | G | G | G | G | G | P | F |
| Clogging in nozzles | | | | G | G | G | G | G | P | G | P |

ND: Impossible to measure because of little weight change

Symbols in Table 1 mean the followings:

MA8: CARBON BLACK MA 8 (trade name) available from Mitsubishi Chemical Corporation S13940: Pigment dispersing agent SOLSPERSE S 13940 (trade name) available from Lubrizol Japan Ltd.

FOC140: FINE OXOCOL 140 (trade name) available from Nissan Chemical Industries, Ltd.

AF4: AF SOLVENT No. 4 (trade name) available from Nippon Oil Corporation

AF5: AF SOLVENT No. 5 (trade name) available from Nippon Oil Corporation

AF6: AF SOLVENT No. 6 (trade name) available from Nippon Oil Corporation

FOC180: FINE OXOCOL 180 (trade name) available from Nissan Chemical Industries, Ltd.

In Examples 1 to 5, good results were obtained in all the test examples since a solvent component having a low boiling point and a high viscosity and a solvent component having a high boiling point and a low viscosity were used in combination. On the other hand, in Comparative Examples 1 and 3, since the viscosity of the solvent component that had the lowest boiling point was low, the change in the viscosity was large and then the clogging in the nozzles occurred. In Comparative Example 2, since the boiling points of all the solvent components were excessively high, the bleeding of the vehicle occurred.

According to the present invention, as described above, a solvent consisting of at least two kinds of components, a first solvent component and a second solvent component, is contained in the vehicle of the ink, wherein the first solvent component has a low boiling point and a high viscosity and the second solvent component has a high boiling point and a low viscosity. Thus, even when the vehicle evaporates with the recording head being left to stand in an open environment, the first solvent component having a low boiling point and a high viscosity evaporates prior to the second solvent component having a high boiling point and a low viscosity. Accordingly, the viscosity increase of ink present in the nozzles of the recording head is inhibited, thereby avoiding poor ink discharge. Furthermore, when the ink droplets are discharged on the recording medium, little solvent remains in the recording medium due to adequate evaporation of the solvent, thereby preventing the bleeding or strike through of the vehicle.

The invention claimed is:

1. An ink for inkjet recording, comprising a vehicle and a colorant dispersed in said vehicle, wherein said vehicle contains at least a first solvent component and a second solvent component, said first solvent component has the lowest boiling point among the components of said ink and a higher viscosity than said ink, and said second solvent component has a higher boiling point than said first solvent component.

2. An ink for inkjet recording according to claim 1, wherein the boiling point of said first solvent component is 280° C. or below.

3. An ink for inkjet recording according to claim 2, wherein said first solvent component is a polar solvent.

4. An ink for inkjet recording according to claim 3, wherein said polar solvent is an alcoholic solvent having 6 or more of carbon atoms in one molecule.

5. An ink for inkjet recording according to any of claims 1 to 4, wherein the content of said first solvent component is 10 to 80% by weight based on the total weight of the ink.

6. An ink for inkjet recording according to claim 1, wherein a viscosity change of the ink at the time when the weight of the ink reduces by 30% after the ink has been allowed to stand in open state, satisfies the following inequality:

$$-10 < 100 \times (\eta_{30} - \eta_0)/\eta_0 < 25$$

wherein $\eta_0$ denotes the viscosity of the ink before being allowed to stand, $\eta_{30}$ denotes the viscosity of the ink at the time when the weight of the ink has been reduced by 30% after being allowed to stand at 50° C. in open state, and $100 \times (\eta_{30} - \eta_0)$ denotes the change in ink viscosity.

7. An ink for inkjet recording according to claim 1, wherein the viscosity of the ink at 23° C. is 5 to 30 mPa·s.

8. An ink for inkjet recording according to claim 1, wherein the weight loss of the ink after the ink has been left to stand in open state at 50° C. for 10 days is 0.04 g/cm$^2$ or more.

9. An ink for inkjet recording that comprises a vehicle and a colorant dispersed in said vehicle, wherein said vehicle contains at least a first solvent component and a second solvent component, said first solvent component has the lowest boiling point among the components of said ink and a higher viscosity than said ink, and said second solvent component has a higher boiling point than said first solvent component and a lower viscosity than said first solvent component.

* * * * *